(12) United States Patent
Yanase (10) Patent No.: US 8,656,768 B2
(45) Date of Patent: Feb. 25, 2014

(54) METHOD, APPARATUS, AND PROGRAM FOR DETECTING TIRE HAVING DECREASED AIR PRESSURE

(75) Inventor: Minao Yanase, Kobe (JP)

(73) Assignee: Sumitomo Rubber Industries Ltd., Tokyo (JP)

(*) Notice: Subject to any disclaimer, the term of this patent is extended or adjusted under 35 U.S.C. 154(b) by 77 days.

(21) Appl. No.: 13/537,425

(22) Filed: Jun. 29, 2012

(65) Prior Publication Data

US 2013/0098149 A1   Apr. 25, 2013

(30) Foreign Application Priority Data

Oct. 21, 2011   (JP) .................................. 2011-231316

(51) Int. Cl.
*B60C 23/02*   (2006.01)

(52) U.S. Cl.
USPC ........................................................ 73/146.5

(58) Field of Classification Search
USPC ................................................. 73/146–146.8
See application file for complete search history.

(56) References Cited

U.S. PATENT DOCUMENTS

| | | | |
|---|---|---|---|
| 2010/0126264 A1* | 5/2010 | Oshiro | 73/146.2 |
| 2010/0225463 A1* | 9/2010 | Fujita et al. | 340/443 |
| 2011/0107828 A1* | 5/2011 | Kawasaki | 73/146.2 |
| 2011/0288718 A1* | 11/2011 | Wada | 701/29 |
| 2012/0118056 A1* | 5/2012 | Shuto | 73/146.3 |
| 2012/0304754 A1* | 12/2012 | Oshiro et al. | 73/146 |

FOREIGN PATENT DOCUMENTS

| | | |
|---|---|---|
| JP | 2005-126013 A | 5/2005 |
| JP | 2005-127975 A | 5/2005 |
| JP | 2005-153544 A | 6/2005 |

\* cited by examiner

*Primary Examiner* — Andre Allen
(74) *Attorney, Agent, or Firm* — Birch, Stewart, Kolasch & Birch, LLP (57) ABSTRACT

A method for detecting a tire having decreased air pressure based on wheel rotation information obtained from the tire attached to a vehicle in which there is a predetermined difference between front and rear wheel loads. The method includes the steps of acquiring wheel rotation information obtained from the tire, storing the wheel rotation information, acquiring a load sensitivity of a tire dynamic loaded radius due to load shift during turning, acquiring speed dependency of the load sensitivity, comparing load sensitivity of the tire dynamic loaded radius at a speed acquired based on the speed dependency with preliminarily stored load sensitivities of dynamic loaded radiuses of various tires, estimating decreased pressure sensitivity of the tire dynamic loaded radius based on a result of the comparison, and determining that the tire has a decreased air pressure based on a result of the estimation.

9 Claims, 5 Drawing Sheets

METHOD, APPARATUS, AND PROGRAM FOR DETECTING TIRE HAVING DECREASED AIR PRESSURE

TECHNICAL FIELD

The present invention relates to a method, an apparatus, and a program for detecting a tire having a decreased air pressure.

BACKGROUND ART

A tire dynamic loaded radius is changed by a load. When the load becomes heavier, the dynamic loaded radius becomes smaller, and accordingly, a wheel speed is increased. Regarding such a load sensitivity, a formally established definition does not exist. However, in general, a change ratio of the dynamic loaded radius to a fixed amount of a load change serves as the load sensitivity.

This load sensitivity is conventionally used for an alarm apparatus of a tire having a decreased air pressure or used for estimating a decreased pressure sensitivity of the dynamic loaded radius (decrease ratio of the dynamic loaded radius to a fixed rate of a decreased pressure) (see Patent Literatures 1 to 3, for example).

The load sensitivity is measured as an inclination of a relational expression of a lateral acceleration (lateral G) and a speed difference between left and right wheels of a vehicle. Thus, the load sensitivity can be measured only when the vehicle makes a turning running. The load sensitivity is not a fixed value but has a speed dependency changed by a vehicle speed. Therefore, there is a need for acquiring the load sensitivity in accordance with the vehicle speed. Thus, in order to measure the load sensitivity at a certain speed, there is a proposed measure for, for example, providing a speed window. However, even in this case, there is a need for the turning running of the vehicle at the speed.

CITATION LIST

Patent Literature

{Patent Literature 1} Japanese Unexamined Patent Publication No. 2005-126013
{Patent Literature 2} Japanese Unexamined Patent Publication No. 2005-127975
{Patent Literature 3} Japanese Unexamined Patent Publication No. 2005-153544

SUMMARY OF INVENTION

Technical Problem

However, although there are relatively many opportunities to make the turning running during a running at a low or middle speed, there are fewer opportunities to make a turning during a running at a high speed. Thus, there is sometimes a case where it takes a long time for measuring the load sensitivity in a high speed region, and convenience of an apparatus for detecting a tire having a decreased air pressure utilizing such a load sensitivity is lowered.

The present invention has been made in view of the situation as described above. It is an objective of the present invention to provide a method, an apparatus, and a program for detecting a tire having a decreased air pressure, in which a speed dependency of a load sensitivity can be efficiently measured for a short time, and the convenience of the apparatus for detecting a tire having a decreased air pressure utilizing such a load sensitivity can be improved.

Solution to Problem (1) In accordance with the present invention, there is provided a method for detecting a tire having a decreased air pressure (hereinafter also simply referred to as "detection method") based on wheel rotation information to be obtained from the tire attached to a vehicle in which there is a predetermined difference between a front wheel load and a rear wheel load, including: a step of acquiring the wheel rotation information to be obtained from the tire; a step of storing the wheel rotation information; a step of acquiring a load sensitivity of a tire dynamic loaded radius due to a load shift during a turning; a step of acquiring a speed dependency of the load sensitivity; a step of comparing a load sensitivity of a tire dynamic loaded radius at a speed acquired based on the speed dependency with preliminarily stored load sensitivities of dynamic loaded radiuses of various tires; a step of estimating a decreased pressure sensitivity of the tire dynamic loaded radius based on a result of the comparison; and a step of determining that the tire has a decreased air pressure based on a result of the estimation, wherein the speed dependency is acquired from a change of a front and rear wheel speed ratio.

In the detection method of the present invention, the speed dependency of the load sensitivity of the dynamic loaded radius is acquired from the change of the front and rear wheel speed ratio of the vehicle. Thus, the speed dependency of the load sensitivity can be acquired not only during a turning running as in a conventional method but also during a straight running. As a result, the speed dependency of the load sensitivity can be efficiently measured for a short time.

(2) In the detection method of (1), the speed dependency may be acquired by "(front and rear wheel speed ratio−1)/front and rear wheel load difference".

(3) The detection method of (1) or (2) may include a step of correcting the speed dependency acquired from the change of the front and rear wheel speed ratio based on a relation between a speed dependency of a load sensitivity acquired from a lateral acceleration and a left and right wheel speed difference and the speed dependency acquired from the change of the front and rear wheel speed ratio, the relation being preliminarily acquired for each vehicle type.

(4) The detection method of (1) or (2) may include a step of rejecting data of the front and rear wheel speed ratio when an absolute value of wheel torque of the vehicle exceeds 60 Nm.

(5) In accordance with the present invention, there is also provided an apparatus for detecting a tire having a decreased air pressure (hereinafter also simply referred to as "detection apparatus") based on wheel rotation information to be obtained from the tire attached to a vehicle in which there is a predetermined difference between a front wheel load and a rear wheel load, including: wheel rotation information obtaining means for acquiring the wheel rotation information to be obtained from the tire; storage means for storing the wheel rotation information; load sensitivity obtaining means for acquiring a load sensitivity of a tire dynamic loaded radius due to a load shift during a turning; speed dependency obtaining means for acquiring a speed dependency of the load sensitivity; comparison means for comparing a load sensitivity of a tire dynamic loaded radius at a speed acquired based on the speed dependency with preliminarily stored load sensitivities of dynamic loaded radiuses of various tires; decreased pressure sensitivity estimation means for estimating a decreased pressure sensitivity of the tire dynamic loaded radius based on a result of the comparison; and determination means for determining that the tire has a decreased air pressure based on a result of the estimation, wherein the speed dependency is acquired from a change of a front and rear wheel speed ratio.

In the detection apparatus of the present invention, the speed dependency of the load sensitivity of the dynamic loaded radius is acquired from the change of the front and rear wheel speed ratio of the vehicle. Thus, the speed dependency of the load sensitivity can be acquired not only during a turning running as in a conventional apparatus but also during a straight running. As a result, the speed dependency of the load sensitivity can be efficiently measured for a short time.

(6) In the detection apparatus of (5), the speed dependency may be acquired by "(front and rear wheel speed ratio−1)/ front and rear wheel load difference".

(7) The detection apparatus of (5) or (6) may include correction means for correcting the speed dependency acquired from the change of the front and rear wheel speed ratio based on a relation between a speed dependency of a load sensitivity acquired from a lateral acceleration and a left and right wheel speed difference and the speed dependency acquired from the change of the front and rear wheel speed ratio, the relation being preliminarily acquired for each vehicle type.

(8) The detection apparatus of (5) or (6) may include rejection means for rejecting data of the front and rear wheel speed ratio when an absolute value of wheel torque of the vehicle exceeds 60 Nm.

(9) In accordance with the present invention, there is further provided a program for detecting a tire having a decreased air pressure based on wheel rotation information to be obtained from the tire attached to a vehicle in which there is a predetermined difference between a front wheel load and a rear wheel load, the program making a computer function as: wheel rotation information obtaining means for acquiring the wheel rotation information to be obtained from the tire; storage means for storing the wheel rotation information; load sensitivity obtaining means for acquiring a load sensitivity of a tire dynamic loaded radius due to a load shift during a turning; speed dependency obtaining means for acquiring a speed dependency of the load sensitivity; comparison means for comparing a load sensitivity of a tire dynamic loaded radius at a speed acquired based on the speed dependency with preliminarily stored load sensitivities of dynamic loaded radiuses of various tires; decreased pressure sensitivity estimation means for estimating a decreased pressure sensitivity of the tire dynamic loaded radius based on a result of the comparison; and determination means for determining that the tire has a decreased air pressure based on a result of the estimation, wherein the speed dependency is acquired from a change of a front and rear wheel speed ratio.

Advantageous Effects of Invention

According to the method, the apparatus, and the program for detecting a tire having a decreased air pressure of the present invention, the speed dependency of the load sensitivity can be efficiently measured for a short time, and the convenience of the apparatus for detecting a tire having a decreased air pressure utilizing such a load sensitivity can be improved.

DESCRIPTION OF EMBODIMENTS

Figure 1:
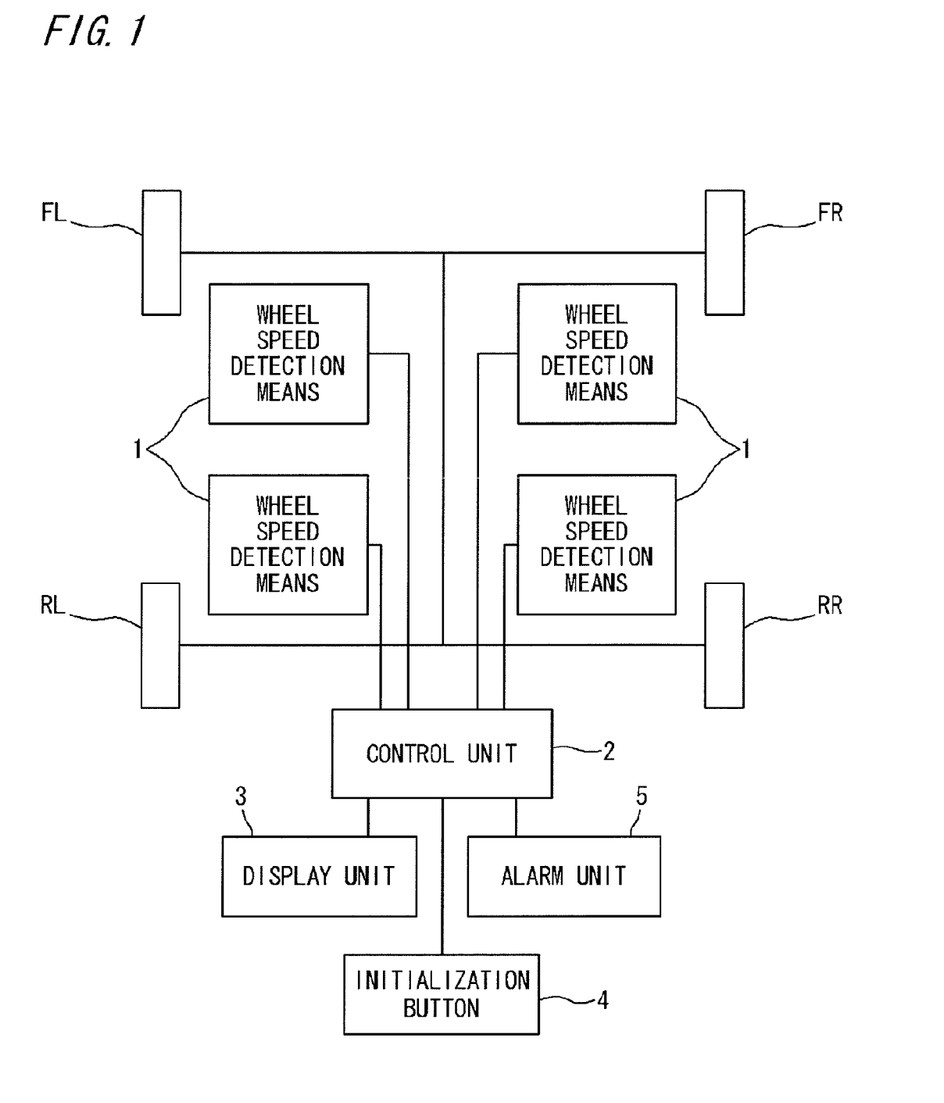
FIG. 1 is a block diagram illustrating one embodiment of a detection apparatus of the present invention.

The following section will describe an embodiment of a method, an apparatus, and a program for detecting a tire having a decreased air pressure of the present invention in detail with reference to the attached drawings. FIG. 1 is a block diagram illustrating a detection apparatus according to one embodiment of the present invention, and FIG. 2 is a block diagram illustrating an electrical configuration of the detection apparatus shown in FIG. 1.

As shown in FIG. 1, the detection apparatus according to one embodiment of the present invention comprises, in order to detect a rotation speed regarding four tires attached to a four-wheel vehicle of a left-front wheel (FL), a right-front wheel (FR), a left-rear wheel (RL), and a right-rear wheel (RR), normal wheel speed detection means 1 that is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as a one that generates power using rotation as in a dynamo to measure an angular velocity and a wheel speed based on the voltage of the generated power. An output from the wheel speed detection means 1 is given to a control unit 2 that is a computer such as ABS. Connected to the control unit 2 are a display unit 3 comprising a liquid crystal display element, a plasma display element, or CRT for example for displaying a tire having a decreased internal pressure; an initialization button 4 that can be operated by a driver; and an alarm unit 5 for notifying the driver of a tire having a decreased internal pressure.

Figure 2:
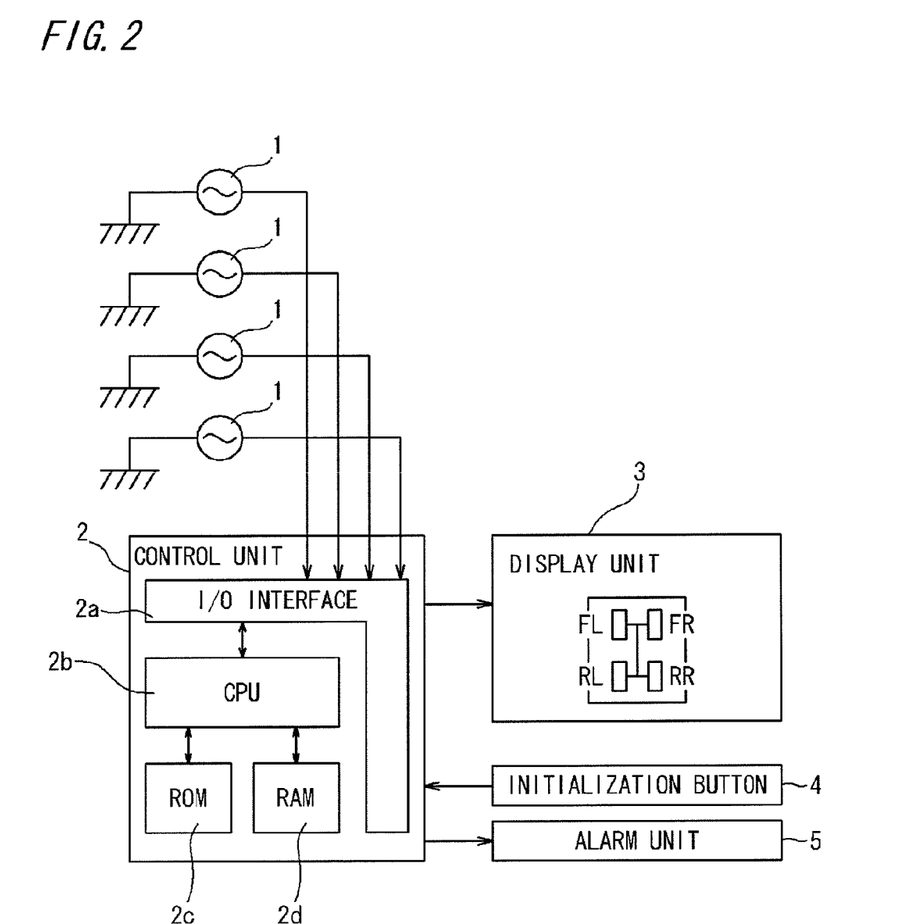
FIG. 2 is a block diagram illustrating an electrical configuration of the detection apparatus shown in FIG. 1.

As shown in FIG. 2, the control unit 2 is composed of: an I/O interface 2a required for exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities Fi of the respective tires at every predetermined sampling cycle $\Delta T$(sec) (e.g., $\Delta T=0.05$ seconds).

The detection apparatus according to the present embodiment includes wheel rotation information obtaining means for acquiring wheel rotation information of the tires calculated from measured values by the above-described wheel speed detection means 1, storage means for storing the wheel rotation information, load sensitivity obtaining means for acquiring a load sensitivity of a tire dynamic loaded radius due to a load shift during a turning, speed dependency obtaining means for acquiring a speed dependency of the load sensitivity, comparison means for comparing a load sensitivity of a tire dynamic loaded radius at a speed acquired based on the speed dependency with preliminarily stored load sensitivities of dynamic loaded radiuses of various tires, decreased pressure sensitivity estimation means for estimating a decreased pressure sensitivity of the tire dynamic loaded radius based on a result of the comparison, and determination means for determining that the tire has a decreased air pressure based on a result of the estimation. The speed dependency is acquired from a change of a front and rear wheel speed ratio.

A program for a tire having a decreased air pressure according to the present embodiment is installed in the control unit 2, and makes the control unit 2 function as the wheel rotation information obtaining means, the storage means, the load sensitivity obtaining means, the speed dependency obtaining means, the comparison means, the decreased pressure sensitivity estimation means, and the determination means.

In the present embodiment, the speed dependency of the load sensitivity of the tire dynamic loaded radius is acquired from the change of the speed ratio between the front and rear wheels of the vehicle. The change of the front and rear wheel speed ratio can be acquired not only during a turning running but also during a straight running. Thus, the speed dependency of the load sensitivity can be efficiently acquired for a short time including a running at a high speed.

Hereinafter, an example of a method for acquiring the speed dependency of the load sensitivity from the change of the front and rear wheel speed ratio of the vehicle will be described.

[Speed Dependency of Load Sensitivity]

For example, it is assumed that a load difference exists between the front wheels and the rear wheels of the vehicle as in a light load condition of a FF vehicle. In a normal vehicle, the specification is not different among four tires but all the same. However, the tire dynamic loaded radius includes a manufacturing error even when the specification is the same among all the tires. Thus, "(front and rear wheel speed ratio−1)/front and rear wheel load difference" does not represent the load sensitivity itself. However, it can be thought that (front and rear wheel speed ratio−1) represents the speed dependency of the load sensitivity by the following reason. The front and rear wheel speed ratio can be acquired even upon the straight running. Thus, the speed dependency of the load sensitivity can be relatively easily acquired.

The specification is the same among the front wheel tires and the rear wheel tires, and the dynamic loaded radius is equal among the front and rear wheels. The dynamic loaded radius of the front wheels at a speed V and a load L is DLRf(V, L), and the dynamic loaded radius of the rear wheels at the speed V and the load L is DLRr(V, L). When Vs denotes a low speed, Vf denotes a high speed, Lf denotes a front wheel load, Lr denotes a rear wheel load, and DLRav denotes average DLR of the front wheels and the rear wheels, Lf>Lr is established in general in a light load state. When the load and the speed are equal with being "DLRf(V, L)=DLRr(V, L)", "{DLRr(V, Lr)−DLRf(V, Lf)}/DLRav" represents the "load sensitivity" for example. Further, "[{DLRr(Vf, Lr)−DLRf(Vf, Lf)}−{DLRr(Vs, Lr)−DLRf(Vs, Lf)}]/DLRav" represents the speed dependency of the load sensitivity.

However, in actual tires, the specification is the same but DLR is slightly different between the tires as described above. For example, with DLRr→DLRr+e, the load sensitivity is "{DLRr(V, Lr)+e−DLRf(V, Lf)}/{DLRav+e/2}".

Since "e" of the numerator is sufficiently larger than "DLRr(V, Lr)−DLRf(V, Lf)", this formula does not represent an accurate load sensitivity. However, regarding the speed dependency of the load sensitivity, "[{DLRr(Vf, Lr)+e−DLRf(Vf, Lf)}−{DLRr(Vs, Lr)+e−DLRf(Vs, Lf)}]/{DLRav+e/2}=[{DLRr(Vf, Lr)−DLRf(Vf, Lf)}−{DLRr(Vs, Lr)−DLRf(Vs, Lf)}]/{DLRav+e/2}". Since "e/2" is sufficiently smaller than DLRav, "≈[{DLRr(Vf, Lr)−DLRf(Vf, Lf)}−{DLRr(Vs, Lr)−DLRf(Vs, Lf)}]/DLRav". Therefore, it can be said that the speed dependency of the front and rear wheel ratio sufficiently represents the speed dependency of the load sensitivity.

Acquiring the speed dependency of the load sensitivity from the front and rear wheel speed ratio of the vehicle is limited to a case where there is a predetermined difference between the front wheel load and the rear wheel load such as the light load condition of the FF vehicle. This "predetermined difference" is not particularly limited in the present invention. However, in general, when there is a difference of about 100 kg, the speed dependency of the load sensitivity can be acquired from the front and rear wheel speed ratio of the vehicle. Whether or not there is a difference between the front and rear wheel loads in an empty vehicle state is found from the specification of the vehicle.

Whether or not cargos are loaded in the vehicle can be acquired by a known method for estimating a vehicle mass (such as one disclosed in Japanese Unexamined Patent Publication No. 2009-40080, Japanese Unexamined Patent Publication No. 2010-249597, and Japanese Unexamined Patent Publication No. 2011-180085 filed by the present applicant). For example, in the method described in Japanese Unexamined Patent Publication No. 2009-40080, a vehicle travels on a road surface of an inclination angle θ, and when a mass of the vehicle is m, the vehicle speed is V, a vehicle acceleration is α, axle shaft torque of the vehicle is T, drive force is Fx, a tire load radius is R, the inclination angle of the road surface is θ, aerodynamic drag is A, and a gravitational acceleration is g, the vehicle mass m is estimated by "m(α+g sin(θ))+AV²=Fx=T/R". Specifically, in the apparatus for detecting a tire having a decreased internal pressure, the inclination angle θ of the road surface, the vehicle speed V, and the vehicle acceleration α are acquired with using a GPS device for example, and the vehicle mass m is estimated by the iterative least squares method with using these values.

Further, in order to apply the detection method of the present invention, there is a need for attaching the tires having the same size/specification for the front wheels and the rear wheels. This is because with different size/specification, the load sensitivity is also different.

In order to precisely acquire the speed dependency of the load sensitivity, there is a need for eliminating an influence of slip of drive wheels. Therefore, there is a need for acquiring the front and rear wheel speed ratio in a state that there is no drive force. As a method for eliminating the influence of the slip, for example, there are a method for acquiring the front and rear wheel ratio under the condition of "wheel torque=0" from a regression line based on a relation between the front and rear wheel ratio and the wheel torque, and a method for adopting only data of the front and rear wheel ratio in which an absolute value of the wheel torque is a predetermined value such as 60 Nm or less, in other words, rejecting data of the measured front and rear wheel ratio when the absolute value of the wheel torque exceeds the predetermined value.

A speed dependency of a load sensitivity acquired from lateral G and a left and right wheel speed difference and the speed dependency acquired from the change of the front and rear wheel speed ratio as in the present embodiment are not the same. Thus, there is a need for preliminarily acquiring a relation between the both for each vehicle type. Hereinafter, one example of how to acquire the relation will be described.

[How to Acquire Relation between Both Speed Dependencies]

(1) A type of vehicle in a light load state is traveled at 60 km per hour, and a dynamic loaded radius difference between the front and rear wheels is measured.
(2) A weight is placed on a trunk or a rear seat to make adjustment so that the front wheel load and the rear wheel load become equal. The vehicle is traveled at 60 km per hour as well as (1), and (front and rear wheel ratio−1) is measured. Thereby, a dynamic loaded radius error due to the manufacturing error of the front wheels and the rear wheels is measured.
(3) By subtracting the result of (2) from the result of (1), the dynamic loaded radius difference due to the load difference between the front wheels and the rear wheels can be calculated.
(4) Then, the turning running is performed at 60 km per hour with various turning radiuses, and a relation between the lateral G and the dynamic loaded radius difference (ΔDLR) of the left and right wheels generated by a load shift due to the turning is measured.
(5) Then, a lateral G amount (=La) corresponding to the "dynamic loaded radius difference due to the load difference between the front wheels and the rear wheels" calculated in (3) is calculated. Thereby, the lateral G amount to generate the load shift corresponding to the load difference between the front wheels and the rear wheels is found. This value is a value specific to the vehicle type.

By executing the above steps of (1) to (5) for each vehicle type in advance, the relation between the speed dependency of the load sensitivity acquired from the lateral G and the left and right wheel speed difference and the speed dependency of the load sensitivity acquired from the change of the front and rear wheel speed ratio is preliminarily acquired.

Next, a method for applying the relation acquired in such a way in an actual running will be described.

Figure 3:
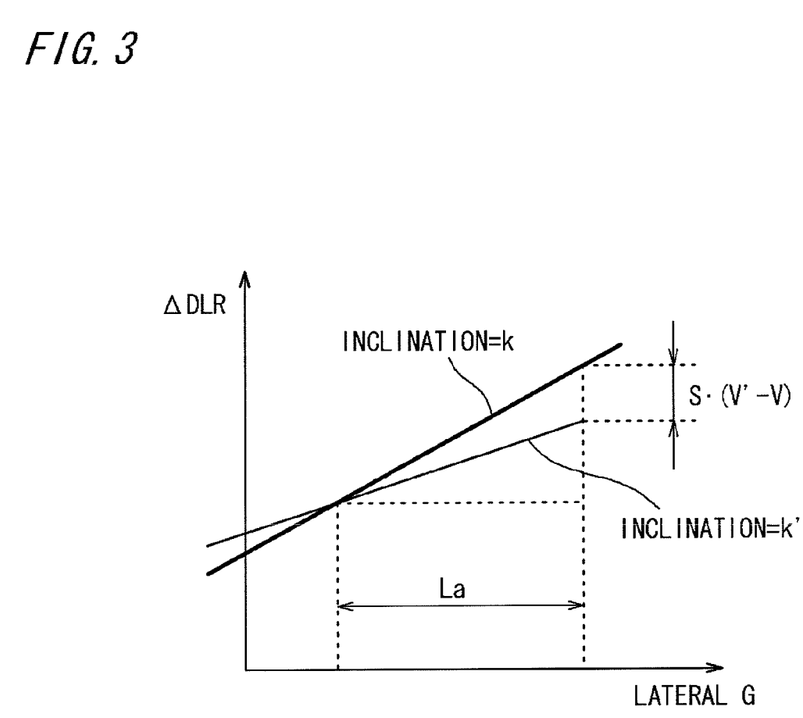
FIG. 3 is an illustrative view of how to acquire a load sensitivity.

(1) In the actual running under a light load state, the speed dependency of the dynamic loaded radius of the front and rear wheels (ΔDLR/ΔV=S) is measured.
(2) When the turning running is performed at a certain speed (=V), the relation between the lateral G and the dynamic loaded radius difference of the left and right wheels can be measured, and the regression line can be drawn, an inclination of the regression line (=k) represents the load sensitivity at the speed (V) as shown in FIG. 3.
(3) By the following formula (1) with using the preliminarily calculated La, the load sensitivity at a speed (V') can be represented.

$$k' = \{k \cdot La - S \cdot (V' - V)\}/La \quad (1)$$

[Load Sensitivity and Decreased Pressure Sensitivity]

Figure 4:
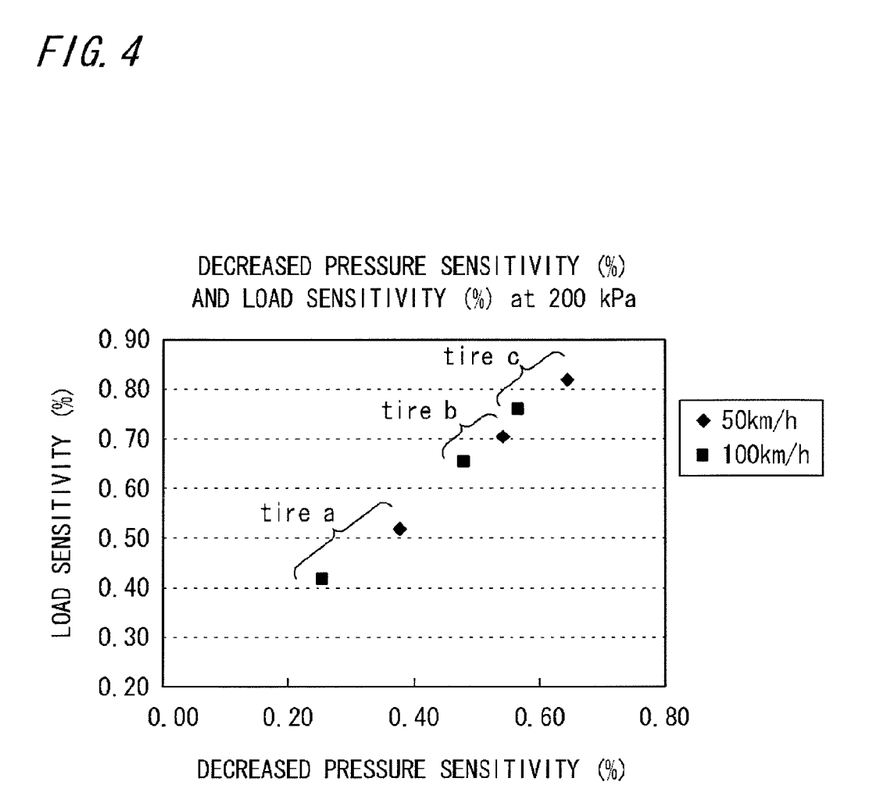
FIG. 4 illustrates one example of a relation between a decreased pressure sensitivity and the load sensitivity.

FIG. 4 illustrates a relation between the load sensitivity of the tire dynamic loaded radius and the decreased pressure sensitivity, which is obtained by successively attaching three size types of tires (tires a, b, and c) and experimentally traveling the vehicle at 50 kph and 100 kph. From FIG. 4, it can be seen that the both show a favorable correlation, and the decreased pressure sensitivity can be estimated from the load sensitivity. Meanwhile, FIG. 4 illustrates that the load sensitivity of the tire dynamic loaded radius is changed by the speed, and it can be seen that there is a need for acquiring the speed dependency of the load sensitivity.

Test Example

Figure 5:
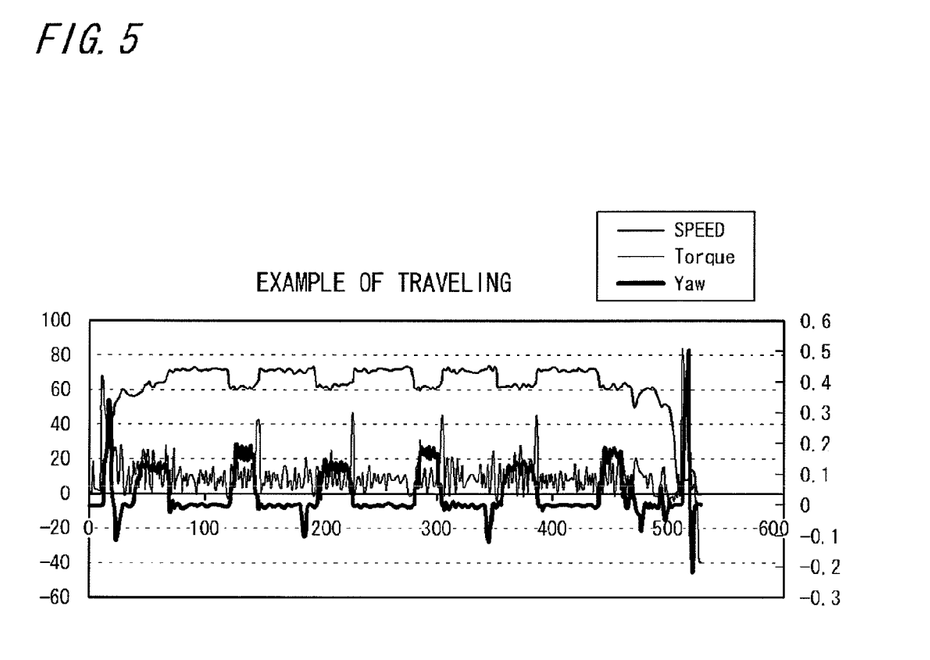
FIG. 5 illustrates one example of a running pattern during a test.

With using two types of tires (tires A and B) having different speed dependencies of the load sensitivities, the speed dependency of the front and rear wheel speed ratio is measured. A test was carried out in the Okayama test course of Sumitomo Rubber Industries, Ltd., and only a part of a straight-ahead driving part was extracted and the front and rear wheel speed ratio was measured. FIG. 5 illustrates one example of a running pattern during the test.

From measurement by a laboratory drum, regarding the dependency of the load sensitivity, it is already found that "tire B>tire A", and the load sensitivity at a high speed is largely decreased in the tire B. The result is shown in Tables 1 and 2. In Tables 1 and 2, LLVW denotes a light load state, and GVW denotes a full load state. DEL2 denotes the front and rear wheel speed ratio.

TABLE 1

Tire A(215/60R16 94H)

|  | 40 kph | 60 kph | 80 kph | 100 kph |
| --- | --- | --- | --- | --- |
| DEL2@LLVW | 0.0030 | 0.0031 | 0.0035 | 0.0034 |
| DEL2@GVW | 0.0011 | 0.0010 | 0.0011 | 0.0009 |

TABLE 2

Tire B(225/50R17 93V)

|  | 40 kph | 60 kph | 80 kph | 100 kph |
| --- | --- | --- | --- | --- |
| DEL2@LLVW | 0.0032 | 0.0031 | 0.0028 | 0.0026 |
| DEL2@GVW | 0.0011 | 0.0010 | 0.0011 | 0.0010 |

From Tables 1 and 2, it can be seen that the load sensitivity is increased as the speed is increased in the tire A, whereas the load sensitivity is decreased as the speed is increased in the tire B, and both the tires have opposite dependencies relative to the speed. A change amount of the load sensitivity due to the speed is larger in the tire B than the tire A. From the present test, it was found that the speed dependency of the load sensitivity can be measured by measuring the speed dependency of the front and rear wheel ratio during the straight running.

[Detection of Tire Having Decreased Air Pressure]

In the method for detecting a tire having a decreased air pressure according to the present embodiment, the load sensitivities of tire dynamic loaded radiuses of various tires preliminarily measured with using the laboratory drum for example are stored in the ROM 2c of the control unit 2. Regarding the various tires, the relation between the speed dependency of the load sensitivity acquired from the lateral G and the left and right wheel speed difference and the speed dependency acquired from the change of the front and rear wheel speed ratio is stored.

(1) During the actual running, as described for example in Patent Literatures 1 to 3, the load sensitivity of the tire dynamic loaded radius due to the load shift during the turning is acquired. Specifically, from the inclination of the regression line of the lateral G obtained from wheel speed information or a lateral acceleration sensor and the left and right wheel speed difference similarly obtained from the wheel speed information, the load sensitivity of the tire dynamic loaded radius due to the load shift during the turning is acquired.

(2) Then, by measuring "(front and rear wheel speed ratio−1)/front and rear wheel load difference", the speed dependency of the load sensitivity of the dynamic loaded radius is acquired. Regarding the front and rear wheel load difference, an approximate value is preliminarily known for each vehicle type if in a light load state.

(3) In the above step (1), when the vehicle speed at the time of being capable of acquiring the load sensitivity (sampling the data of the lateral G and the left and right wheel speed difference to an extent that the regression line can be drawn) is V, the load sensitivity of the tire dynamic loaded radius at another vehicle speed V' can be acquired with using the above-described formula (1).

(4) The load sensitivity of the tire dynamic loaded radius reflecting the speed dependency acquired in the above step (3) is compared with the preliminarily measured load sensitivities of the dynamic loaded radiuses of the various tires. As a result of the comparison, the tire attached to the vehicle is specified, and the decreased pressure sensitivity of the specified tire (decreased pressure sensitivities are stored in the ROM 2c together with the load sensitivities) is estimated. As shown in FIG. 4, as a result of measurement of the various tires, in a case where the relation between the load sensitivity and the decreased pressure sensitivity is already known, the decreased pressure sensitivity can be estimated from the regression line thereof.

(5) By changing a threshold value for decreased pressure determination based on the estimation result of the decreased pressure sensitivity, it is determined more precisely whether or not the tire has a decreased air pressure.

(6) When it is determined that the tire has a decreased air pressure, the alarm unit 5 is activated to invite an attention of the driver.

REFERENCE SIGNS LIST

1: Wheel Speed Detection Means
2: Control Unit
2a: Interface
2b: CPU
2c: ROM
2d: RAM
3: Display Unit
4: Initialization Button
5: Alarm Unit

What is claimed is:

1. A method for detecting a tire having a decreased air pressure based on wheel rotation information to be obtained from the tire attached to a vehicle in which there is a predetermined difference between a front wheel load and a rear wheel load, comprising:
a step of acquiring the wheel rotation information to be obtained from the tire;
a step of storing the wheel rotation information;
a step of acquiring a load sensitivity of a tire dynamic loaded radius due to a load shift during a turning;
a step of acquiring a speed dependency of the load sensitivity;
a step of comparing a load sensitivity of a tire dynamic loaded radius at a speed acquired based on the speed dependency with preliminarily stored load sensitivities of dynamic loaded radiuses of various tires;
a step of estimating a decreased pressure sensitivity of the tire dynamic loaded radius based on a result of the comparison; and
a step of determining that the tire has a decreased air pressure based on a result of the estimation,
wherein the speed dependency is acquired from a change of a front and rear wheel speed ratio.

2. The method for detecting a tire having a decreased air pressure according to claim 1, wherein
the speed dependency is acquired by "(front and rear wheel speed ratio−1)/front and rear wheel load difference".

3. The method for detecting a tire having a decreased air pressure according to claim 1 or 2, further comprising: a step of correcting the speed dependency acquired from the change of the front and rear wheel speed ratio based on a relation between a speed dependency of a load sensitivity acquired from a lateral acceleration and a left and right wheel speed difference and the speed dependency acquired from the change of the front and rear wheel speed ratio, the relation being preliminarily acquired for each vehicle type.

4. The method for detecting a tire having a decreased air pressure according to claim 1 or 2, further comprising: a step of rejecting data of the front and rear wheel speed ratio when an absolute value of wheel torque of the vehicle exceeds 60 Nm.

5. An apparatus for detecting a tire having a decreased air pressure based on wheel rotation information to be obtained from the tire attached to a vehicle in which there is a predetermined difference between a front wheel load and a rear wheel load, comprising:
wheel rotation information obtaining means for acquiring the wheel rotation information to be obtained from the tire;
storage means for storing the wheel rotation information;
load sensitivity obtaining means for acquiring a load sensitivity of a tire dynamic loaded radius due to a load shift during a turning;
speed dependency obtaining means for acquiring a speed dependency of the load sensitivity;
comparison means for comparing a load sensitivity of a tire dynamic loaded radius at a speed acquired based on the speed dependency with preliminarily stored load sensitivities of dynamic loaded radiuses of various tires;
decreased pressure sensitivity estimation means for estimating a decreased pressure sensitivity of the tire dynamic loaded radius based on a result of the comparison; and
determination means for determining that the tire has a decreased air pressure based on a result of the estimation, wherein
the speed dependency is acquired from a change of a front and rear wheel speed ratio.

6. The apparatus for detecting a tire having a decreased air pressure according to claim 5, wherein
the speed dependency is acquired by "(front and rear wheel speed ratio−1)/front and rear wheel load difference".

7. The apparatus for detecting a tire having a decreased air pressure according to claim 5 or 6, further comprising: correction means for correcting the speed dependency acquired from the change of the front and rear wheel speed ratio based on a relation between a speed dependency of a load sensitivity acquired from a lateral acceleration and a left and right wheel speed difference and the speed dependency acquired from the change of the front and rear wheel speed ratio, the relation being preliminarily acquired for each vehicle type.

8. The apparatus for detecting a tire having a decreased air pressure according to claim 5 or 6, further comprising: rejection means for rejecting data of the front and rear wheel speed ratio when an absolute value of wheel torque of the vehicle exceeds 60 Nm.

9. A program for detecting a tire having a decreased air pressure based on wheel rotation information to be obtained from the tire attached to a vehicle in which there is a predetermined difference between a front wheel load and a rear wheel load, the program making a computer function as:

wheel rotation information obtaining means for acquiring the wheel rotation information to be obtained from the tire;

storage means for storing the wheel rotation information;

load sensitivity obtaining means for acquiring a load sensitivity of a tire dynamic loaded radius due to a load shift during a turning;

speed dependency obtaining means for acquiring a speed dependency of the load sensitivity;

comparison means for comparing a load sensitivity of a tire dynamic loaded radius at a speed acquired based on the speed dependency with preliminarily stored load sensitivities of dynamic loaded radiuses of various tires;

decreased pressure sensitivity estimation means for estimating a decreased pressure sensitivity of the tire dynamic loaded radius based on a result of the comparison; and     determination means for determining that the tire has a decreased air pressure based on a result of the estimation, wherein the speed dependency is acquired from a change of a front and rear wheel speed ratio.

\* \* \* \* \*

UNITED STATES PATENT AND TRADEMARK OFFICE
CERTIFICATE OF CORRECTION

PATENT NO. : 8,656,768 B2
APPLICATION NO. : 13/537425
DATED : February 25, 2014
INVENTOR(S) : Minao Yanase

It is certified that error appears in the above-identified patent and that said Letters Patent is hereby corrected as shown below:

ON THE TITLE PAGE:

At item (73), Assignee, change "Sumitomo Rubber Industries Ltd., Tokyo (JP)" to --Sumitomo Rubber Industries Ltd., Kobe (JP)--.

Signed and Sealed this
Twenty-second Day of July, 2014

Michelle K. Lee
*Deputy Director of the United States Patent and Trademark Office*